Figure 1:
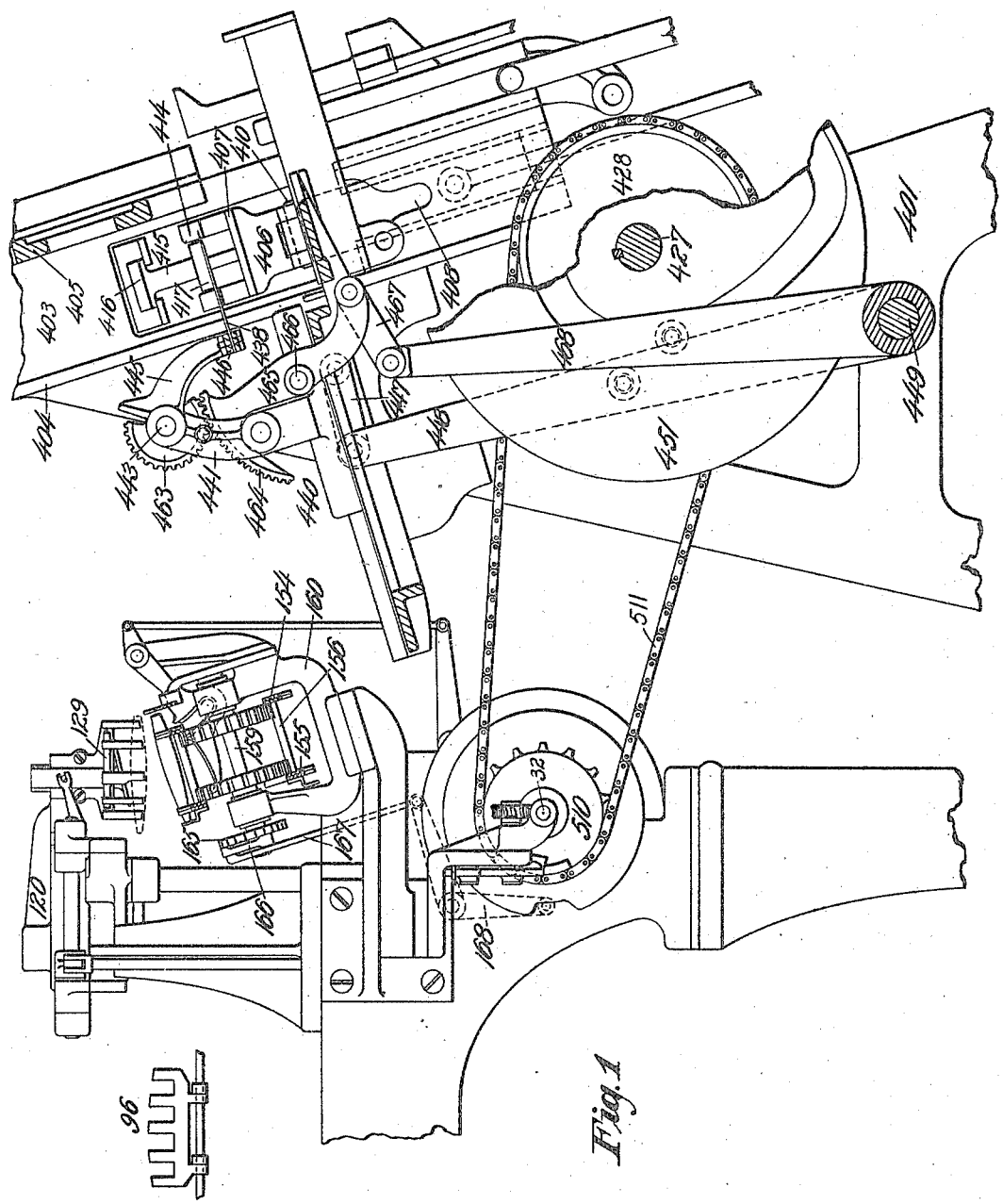

O. TYBERG.
MACHINE FOR REMOVING CIGAR BUNCHES FROM MOLDS.
APPLICATION FILED SEPT. 19, 1902.

947,870.

Patented Feb. 1, 1910.

2 SHEETS—SHEET 1.

Attest.
Augusta White
Sydney F. Prescott

Inventor:
Oluf Tyberg
by Philipp, Sawyer, Rice & Kennedy
Atty's

O. TYBERG.
MACHINE FOR REMOVING CIGAR BUNCHES FROM MOLDS.
APPLICATION FILED SEPT. 19, 1902.
947,870.
Patented Feb. 1, 1910.
2 SHEETS—SHEET 2.
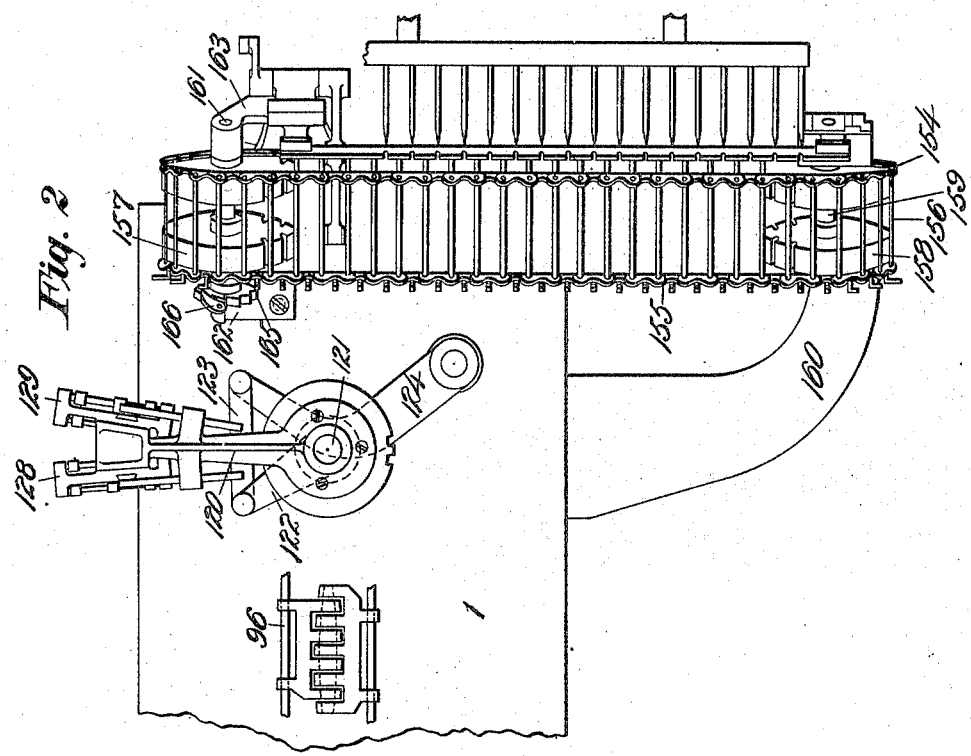
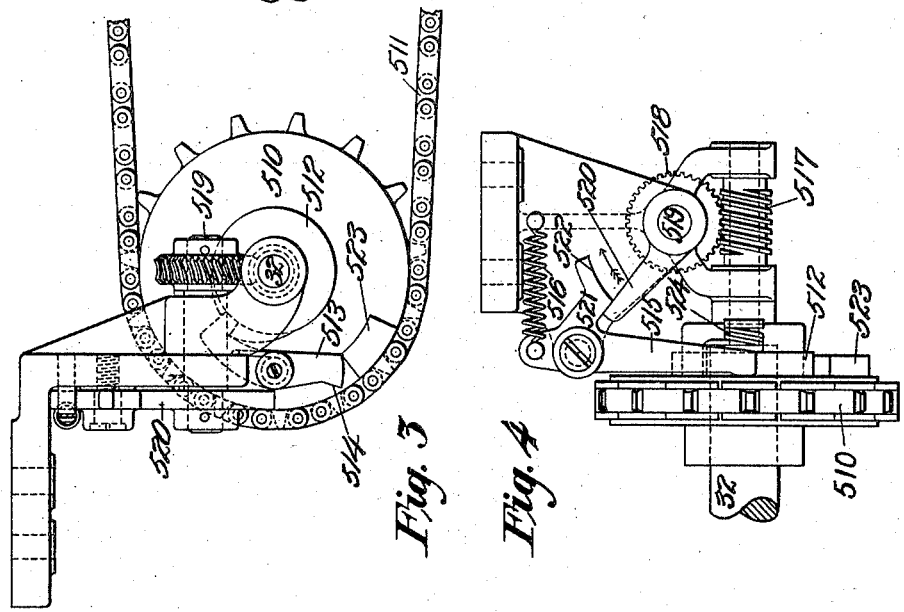
Attest
Augusta White
Sydney J. Prescott
Inventor
Oluf Tyberg
by Philipp, Sawyer, Rice & Kennedy
Atty's the image.

UNITED STATES PATENT OFFICE.

OLUF TYBERG, OF NEW YORK, N. Y., ASSIGNOR TO RUFUS L. PATTERSON AND GEORGE ARENTS, JR., OF NEW YORK, N. Y.

MACHINE FOR REMOVING CIGAR-BUNCHES FROM MOLDS.

947,870.  Specification of Letters Patent.  Patented Feb. 1, 1910.

Application filed September 19, 1902. Serial No. 123,979.

*To all whom it may concern:*

Be it known that I, OLUF TYBERG, a citizen of the United States, residing at New York, county of Kings, and State of New York, have invented certain new and useful Improvements in Machines for Removing Cigar-Bunches from Molds, fully described and represented in the following specification and the accompanying drawings, forming a part of the same.

This invention relates to a machine for supplying cigar bunches to a wrapping mechanism and has for one of its objects to produce a machine in which bunches may be transferred as needed from a suitable support, such, for instance, as a mold, to a wrapping mechanism.

A further object of the invention is to produce a machine which embodies a suitable mechanism for manipulating a cigar mold, that is to say, to bring it into position where the bunches it contains can be suitably operated upon by a bunch removing means, or to open and close it, or to both bring it into position and open and close it, and the bunches then transferred to a wrapping mechanism.

A further object of the invention is to produce a bunch supplying mechanism which shall include means for removing the bunches from a suitable support, such as a mold, and transferring them to a wrapping machine, the means for removing the bunches being under the control of and intermittently brought into operation by the operating mechanism of the wrapping machine, so that the operation of the bunch supplying devices may be automatically effected in harmony with the operation of the wrapping machine.

With these and other objects in view the invention consists in certain constructions and in certain parts, improvements and combinations as will be hereinafter fully described and then specifically pointed out in the claims hereunto appended.

In the accompanying drawings—Figure 1 is a side elevation of so much of a wrapping mechanism, mold manipulating mechanism, and bunch transferring devices as is necessary to an understanding of the invention. Fig. 2 is a plan view of part of the construction shown in Fig. 1, and Figs. 3 and 4 are side and front elevations respectively of a form of clutch mechanism employed.

Referring to the drawings, which illustrate a concrete embodiment of the invention, 1 indicates a part of a frame of a wrapping machine which may be of any suitable character. The wrapping mechanism employed is diagrammatically illustrated at 96, the form selected for the illustration of the invention being the wrapping jaws of the well-known Reuse machine, said machine being fully described and illustrated in the patent granted to J. Reuse, No. 552,447 dated Dec. 31, 1895. It is to be understood, however, that any other suitable form of wrapping mechanism may be substituted for these jaws, the particular form of wrapping mechanism employed not being material to the present invention.

The connections by which the wrapping mechanism is operated are not herein illustrated, as they are not necessary to an understanding of the present invention. When, however, a wrapping mechanism of the Reuse type is used, these connections may be of the character usually employed in operating such machines.

While the bunches which are to be supplied to the wrapping mechanism may be brought within the range of action of the bunch transferring means to be hereinafter described in any suitable manner, they will preferably be presented thereto in molds. To this end, therefore, in the preferred form of the construction, machines embodying the invention will include a suitable mold manipulating mechanism, it being understood that the term "manipulating" as herein used is employed in its generic sense. This mold manipulating mechanism may, if desired, be mounted in the frame of the wrapping mechanism, but it is shown as independently mounted, being sustained in position by a pair of side frames 401, only one of which is shown. In order that the mechanism of the machine may be adapted to operate on a plurality of molds arranged in a stack, each of these side frames is provided with recesses 403 bounded on their rear sides by ribs 404. Extending across the machine from side frame to side frame is a cross bar 405 which in connection with the recesses and ribs forms a guide way or chute.

While the molds may be sustained in the guideway and removed therefrom in any suitable manner, there is provided an abutment consisting of two movable blocks 406, one of which is located on each side of the machine and each of them being provided with a supporting shoulder 407. These blocks are or may be pivoted on a slide 408 moving in suitable ways, the pivots of the blocks being marked 410. In the construction which has been selected to illustrate the invention, this supporting abutment operates not only at times to support the stack of molds, but also to separate the parts of the lowest mold of the stack, so that the bunches may be removed therefrom. To this end, each block is provided with a pair of hooked projections 414 which are spaced apart, said projections being constructed so as to take into the space formed by the shoulders on the upper and lower parts of the ordinary two-part cigar-mold.

In order that the stack of molds and the upper part of the separated mold may be sustained in position while the lower part is being moved away, two supports 415 are employed, one on each side of the machine, these supports being formed with two engaging projections 416, 417 so arranged that when they are in operative position the projections 417 will take into the space between the upper and lower part of the lowest mold and the projections 416 will take into the same space in a mold above the lowest, as, for instance, the mold next above. The projections 417 are further arranged to pass into the space between the retaining projections 414 before described. The slide 408 and the blocks 406 carrying the lower part of the lowest mold will be given a movement away from the upper part of the mold and the stack to open the mold in order to enable the bunch removing means hereinafter described to operate and after the bunch has been removed by the bunch removing means, the slide will be given a movement toward the stack in order to reunite the parts of the mold, these movements in the machine as organized being substantially vertical movements. The supports 415 will be given movements toward and away from the stack, these means in the machine as at present organized being substantially horizontal. The operating means for these supports are omitted from this specification in the interest of clearness. They may, however, and preferably will be the same as those described in the pending application of Oluf Tyberg and Leon Lake, Serial No. 123,980, filed at even date herewith, and reference is made to said application for a full disclosure thereof. It may be remarked, however, that these movements, in the machine referred to, are derived from cams mounted on the operating shaft 27 which extends across the machine from side to side.

The specific form of mold manipulating mechanism hereinbefore described is not claimed herein, as it forms the subject-matter of the application of Oluf Tyberg and Leon Lake above referred to. It is further remarked that while this form of mold manipulating mechanism possesses many marked advantages, and will preferably be that employed, other forms of mechanism for accomplishing the presentation of the bunches to the bunch removing means may be utilized without departing from the scope of the invention.

The bunch removing means employed may be widely varied in construction and will vary according to the particular construction of bunch supplying mechanism employed. Preferably, however, it will include a series of impaling pins 438 which, as shown, are mounted in a cross bar 446, said bar being carried in arms one of which marked 445 is shown as mounted on a shaft 443. This shaft 443 is supported in arms one of which marked 441 is shown and which rises from a slide 440. The slide 440 is connected by means of a link 447 to a lever 448 which is pivoted on a rod 449 extending across the machine from side to side and is by means of a suitable cam groove in a cam disk 451 caused to reciprocate the slide toward and away from the lowest mold of the stack so as to cause the impaling pins to penetrate into the bunches in said mold. When this form of bunch removing means is employed, the cam which operates the slide 440 will be timed to produce a forward movement of the slide or the movement which causes the pins to impale the bunches before the parts of the mold are separated. After the parts of the mold are separated, the pins will be given a slight downward movement to free the bunches from the upper part of the mold, after which the slide retreats, the bunches being carried out of the spaces between the parts of the mold by means of the pins. In the construction shown, after the slide has retreated, the pins will be given a still further movement in order to bring them into position where the bunches are discharged from them. In the construction illustrated, the movement of the pins is effected by means of a segment 463 which is mounted on the shaft 443 before described, said segment being engaged by a segment 464 formed on a segment lever 465 which is pivoted at 466 to the slide 440, the lower end of this lever being connected by means of a link 467 to an operating cam lever 468 mounted on the cross-bar 449. This lever 468 is operated from the cam groove in the cam disk 451 before referred to, the contour of this groove being such as to give the impaling pins the movements before described.

The bunch removing means which has just been described is not herein claimed, being part of the subject-matter which is claimed in the Tyberg and Lake pending application hereinbefore referred to. While, furthermore, this means is very efficient, any other bunch removing means may be employed in lieu thereof, if desired.

In the construction chosen to illustrate the invention, the bunch transferring means further include a receiver to which the impaling pins deliver the bunches. As shown, this receiver consists of a pair of endless chains 154, 155 connected by cross bars 156. These bars are supported on drums 157, 158, the drum 158 being mounted on a shaft 159 which is journaled in a bracket 160 extending from the machine frame, the drum 157 being mounted on a shaft 161 journaled in brackets 162, 163 also extending from the machine frame. The links of the chains are concave on their upper surfaces, thus forming cradles which are adapted to receive the bunches. The receiver is preferably given a step by step movement in order to present the bunches to the bunch transporting mechanism to be hereinafter described. This is effected by means of a ratchet wheel 165 mounted on the shaft 161 and operated by a suitable pawl and pawl carrier 166. This pawl carrier is operated by a rod 167 from a bell-crank lever 168 which is operated by a cam mounted on the shaft 32.

The bunches are transferred from the receiver to the wrapping mechanism by means of a suitable carrier which, as shown, operates not only to carry the bunches from the carrier to the wrapping mechanism, but also to remove the wrapped cigars from the wrapping mechanism and deliver them to the empty spaces in the carrier. This carrier includes an arm 120 mounted on a vertical shaft 121 which is rotated by means of an arm 122 fast on the shaft, said arm being connected by a link 123 to a cam operated arm 124, the cam for operating this arm not being shown. The arm 120 is provided with two branches 128, 129, each of which is provided with suitable devices for holding a bunch and a wrapped cigar, the devices of the branch 129 serving to take the bunch from the chain and deliver it to the wrapping mechanism, and the devices on the branch 128 serving to take the wrapped cigar from the wrapping mechanism and deliver to the chain by which it is discharged in any suitable manner. The receiver and carrier so far described are the same as the receiver and carrier shown in my application No. 73,409, and is not herein claimed, for the reason that the novel features thereof are claimed in said application. The means for operating the retaining devices is not herein shown, because the specific means for operating said devices is not necessary for an understanding of the present invention, and it is, therefore, omitted in the interest of clearness. Reference is made, however, to said application No. 73,409, for a full description thereof.

While the mold manipulating mechanism and the bunch transferring mechanism may be operated in any suitable manner, it is desirable that they be operated from the mechanism of the wrapping machine so that the bunches may be delivered to the wrapping mechanism in accordance with the needs and capacity of said mechanism. The construction by which this is effected may be of any suitable character. As shown, the shaft 32 is provided with a driving sprocket 510 which is loose on the shaft. Over this sprocket passes a sprocket chain 511 which drives a sprocket wheel 428 on the operating shaft 427 of the mold manipulating mechanism. The shaft 32 is a constantly rotating shaft, but since the wheel 510 is loose thereon, it is obvious that no movement of the mold manipulating mechanism will take place until the sprocket 510 is locked to the shaft. This may be effected in any desired manner, but is preferably accomplished through the medium of a clutch mechanism which may be of any desired construction. As shown, the shaft 32 carries a notched collar 512 which is fast on the shaft and rotates therewith. Mounted on the hub of the sprocket 510 is a pivoted pawl 513 having an inclined shoulder 514 on its tail. Suitably mounted on the machine frame is a pivoted tripping lever, which is normally held in such position that one of its arms 515 is in engagement with the shoulder 514, thereby holding the pawl 513 away from the notched collar, the lever being held in this position by a spring 516. The shaft 32 is provided with a worm 517 which meshes with a worm gear 518 which is mounted on a short shaft 519 suitably journaled in the frame. This shaft carries an arm 520 which is arranged to contact at certain times, during the revolution of the shaft 519, with an arm 521 of the lever 515. This arm 521 is further provided with an extending bearing surface 522. The wheel 510 also carries a stopping block 523. The worm gearing 517, 518 is so arranged as to cause the shaft 519 to make a single revolution for a given number of revolutions, say twenty, of the shaft 32. If this be the proportion of the gearing, the shaft 32 will make nineteen revolutions without producing any movement of the driving sprocket 510. On the twentieth revolution of the shaft 32, the arm 520 strikes the arm 521 and forces the lever 515 against the stress of the spring 516 out of the path of the pawl 513. This pawl is then thrown forward by a coiled spring 524, or in any other suitable manner, so as to engage the notched collar 512. This operation locks the sprocket 510 to the shaft 32 and the mold manipulating mechanism is driven. The arm 520 remains in contact with the arm 521 by means of the bearing surface 522 until the wheel 510 is rotated sufficiently to take the pawl 513 out of the path of the lever 515. As the arm 520 passes out of contact with the bearing surface 522 the spring 516 throws the arm 515 back into position so that as the wheel 510 completes its revolution, the end of the lever strikes the inclined surface 514 of the pawl and forces it out of engagement with the notched collar, thus releasing the sprocket 510 from the shaft. At the same time, the stopping block 523 strikes against the end of the lever 515 and brings the sprocket to a positive stop. While the clutch mechanism which has just been described is an effective one, any other suitable form of mechanism may be substituted therefor.

It will be understood from the foregoing specification that the invention which forms the subject of this application is not concerned with the specific details of construction by which it is carried into effect, but that it resides broadly in the combination of elements hereinafter claimed.

What is claimed is:—

1. The combination with a wrapping mechanism, of means for transferring bunches thereto, and means for simultaneously bringing a plurality of bunches within the range of action of the transferring mechanism, substantially as described.

2. The combination with a wrapping mechanism, of means for supporting a plurality of bunches, and means for transferring bunches from the supporting means to the wrapping mechanism, substantially as described.

3. The combination with a wrapping mechanism, of means for supporting a bunch, a bunch removing means, a receiver, and a bunch carrier operating between the receiver and the wrapping mechanism, substantially as described.

4. The combination with a wrapping mechanism, of means for supporting a mold, and means for transferring the bunch from the mold to the wrapping mechanism, substantially as described.

5. The combination with a wrapping mechanism, of means for supporting a mold containing a plurality of bunches, and means for transferring the bunches from the mold to the wrapping mechanism, substantially as described.

6. The combination with a wrapping mechanism, of means for supporting a mold containing a plurality of bunches, means for simultaneously removing the bunches from the mold, and means for presenting the bunches successively to the wrapping mechanism, substantially as described.

7. The combination with a wrapping mechanism, of means for supporting a mold containing a plurality of bunches, a receiver, a bunch removing means operating to simultaneously remove the bunches from the mold to the receiver, and means for successively transporting the bunches from the receiver to the wrapping mechanism, substantially as described.

8. The combination with a wrapping mechanism, of means for supporting a mold containing a plurality of bunches, a receiver, means for giving the receiver a step by step movement, means for removing the bunches from the mold to the receiver, and means for transporting the bunches from the receiver to the wrapping mechanism, substantially as described.

9. The combination with a wrapping mechanism, of means for supporting a mold containing a plurality of bunches, a receiver, means for giving the receiver a step by step movement, means for simultaneously removing the bunches from the mold to the receiver, and means for successively transporting the bunches from the receiver to the wrapping mechanism, substantially as described.

10. The combination with a wrapping mechanism, of means for supporting a mold arranged to contain a plurality of bunches, a bunch removing means including a plurality of impaling devices, means whereby the impaling devices are caused to impale the bunches, means for operating the impaling devices to cause them to remove the bunches from the mold, a receiver to which the impaling devices deliver the bunches, means for giving the receiver a step by step movement, and a bunch carrier operating between the receiver and the wrapping mechanism, substantially as described.

11. The combination with a wrapping mechanism, of means for supporting a mold arranged to contain a plurality of bunches, a bunch removing means including a plurality of impaling devices, means whereby the impaling devices are caused to impale the bunches, means for operating the impaling devices to cause them to remove the bunches from the mold, a receiver to which the impaling devices deliver the bunches, means for giving the receiver a step by step movement, and a bunch carrier including a swinging arm having bunch retaining devices, said bunch carrier operating between the receiver and the wrapping mechanism, substantially as described.

12. The combination with a wrapping mechanism, of an operating shaft in connection therewith, means for supporting a plurality of bunches, bunch transferring means including bunch removing devices, and means whereby the operating shaft of the wrapping mechanism controls the operation of the bunch removing devices, substantially as described.

13. The combination with a wrapping mechanism, of an operating shaft in connection therewith, mold manipulating mechanism, bunch transferring devices including means for removing a plurality of bunches from a mold, and means whereby the operating shaft controls the operation of the bunch removing means and the mold manipulating mechanism, substantially as described.

14. The combination with a wrapping mechanism, of an operating shaft in connection therewith, mold manipulating mechanism including means for opening and closing the mold, bunch transferring devices including means for removing a plurality of bunches from a mold, and means whereby the operating shaft controls the operation of the bunch removing means and the mold manipulating mechanism, substantially as described.

15. The combination with a wrapping mechanism, of a receiver, a bunch carrier operating between the wrapping mechanism and the receiver, an operating shaft, means whereby said shaft produces an intermittent operation of the receiver, means for supporting a mold, bunch removing means, and means whereby the operating shaft produces an intermittent operation of the bunch removing means, substantially as described.

16. The combination with a wrapping mechanism, of an operating shaft in connection therewith, bunch transferring means including means for removing a plurality of bunches from a mold, a mold manipulating mechanism, an operating shaft therefor, operating connections between said shaft and the bunch removing means, and means whereby the operating shaft of the wrapping mechanism produces an intermittent operation of the operating shaft of the mold manipulating mechanism, substantially as described.

17. The combination with a wrapping mechanism, of an operating shaft therefor, a receiver, a bunch carrier operating between the receiver and the wrapping mechanism and driven by said shaft, a mold manipulating mechanism including devices for opening and closing the mold, an operating shaft therefor, bunch removing devices including a plurality of impaling devices, operating connections between said impaling devices and the shaft of the mold manipulating mechanism, and driving connections including clutch devices between the two operating shafts, substantially as described.

In testimony whereof, I have hereunto set my hand, in the presence of two subscribing witnesses.

OLUF TYBERG.

Witnesses:
SYDNEY IRVIN PRESCOTT,
FRANK H. VICK.